United States Patent [19]
Richard

[11] Patent Number: 5,941,535
[45] Date of Patent: Aug. 24, 1999

[54] CAST-IN-PLACE PIPE SUPPORT HAVING A REVERSIBLE PIPE SEAL AND REMOVABLE CLOSURE DISK

[76] Inventor: James G. Richard, 20 Woodland Dr., Canton, Conn. 06019

[21] Appl. No.: 08/864,768

[22] Filed: May 29, 1997

[51] Int. Cl.[6] .................................................. F16J 15/02
[52] U.S. Cl. ........................ 277/606; 52/220.8; 277/604; 277/607
[58] Field of Search ................................. 52/27, 21, 100, 52/220.1, 220.8; 248/49; 277/590, 602, 604, 606, 607, 626, 917

[56] References Cited

U.S. PATENT DOCUMENTS

| | | | |
|---|---|---|---|
| 3,787,061 | 1/1974 | Yoakum | 277/606 X |
| 4,103,901 | 8/1978 | Ditcher | 277/606 |
| 4,387,900 | 6/1983 | Ditcher et al. | 277/606 X |
| 4,732,397 | 3/1988 | Gavin . | |
| 4,805,920 | 2/1989 | Gavin | 52/21 X |
| 4,809,994 | 3/1989 | Skinner et al. | 277/606 |
| 4,951,914 | 8/1990 | Meyers et al. . | |
| 5,248,154 | 9/1993 | Westhoff et al. | 277/606 |
| 5,286,040 | 2/1994 | Gavin | 277/606 |
| 5,529,312 | 6/1996 | Skinner et al. | 277/604 |
| 5,624,123 | 4/1997 | Meyers | 277/604 |
| 5,711,536 | 1/1998 | Meyers | 277/606 |

Primary Examiner—Carl D. Friedman
Assistant Examiner—Kevin D. Wilkens
Attorney, Agent, or Firm—St. Onge Steward Johnston & Reens LLC

[57] ABSTRACT

A pipe support for mounting a pipe within a pipe-receiving aperture of a concrete container. The pipe support includes an annular anchor, a pipe seal and a removable closure. The annular anchor is for being cast in place within the concrete container surrounding the pipe-receiving aperture. The pipe seal has a flexible, reversible, generally frusto-conical outer portion extending axially rearward and radially inward from the anchor to a joint of the pipe seal. A flexible, reversible, generally frusto-conical inner portion extends axially forward and radially inward from the joint to a smaller diameter end of the pipe seal for receiving a pipe in a generally water-tight manner. The outer portion of the pipe seal can be reversed so that the pipe seal will extend out of the concrete container so that a pipe can be inserted therethrough from inside the container. Alternatively, the inner portion of the pipe seal can be reversed so that the pipe seal will extend into the concrete container so that a pipe can be inserted therethrough from outside the container. The pipe support also includes a removable closure closing the smaller diameter end of the inner portion for sealing in a watertight manner the pipe-receiving aperture of the concrete container when the pipe support is not used to mount a pipe.

9 Claims, 7 Drawing Sheets

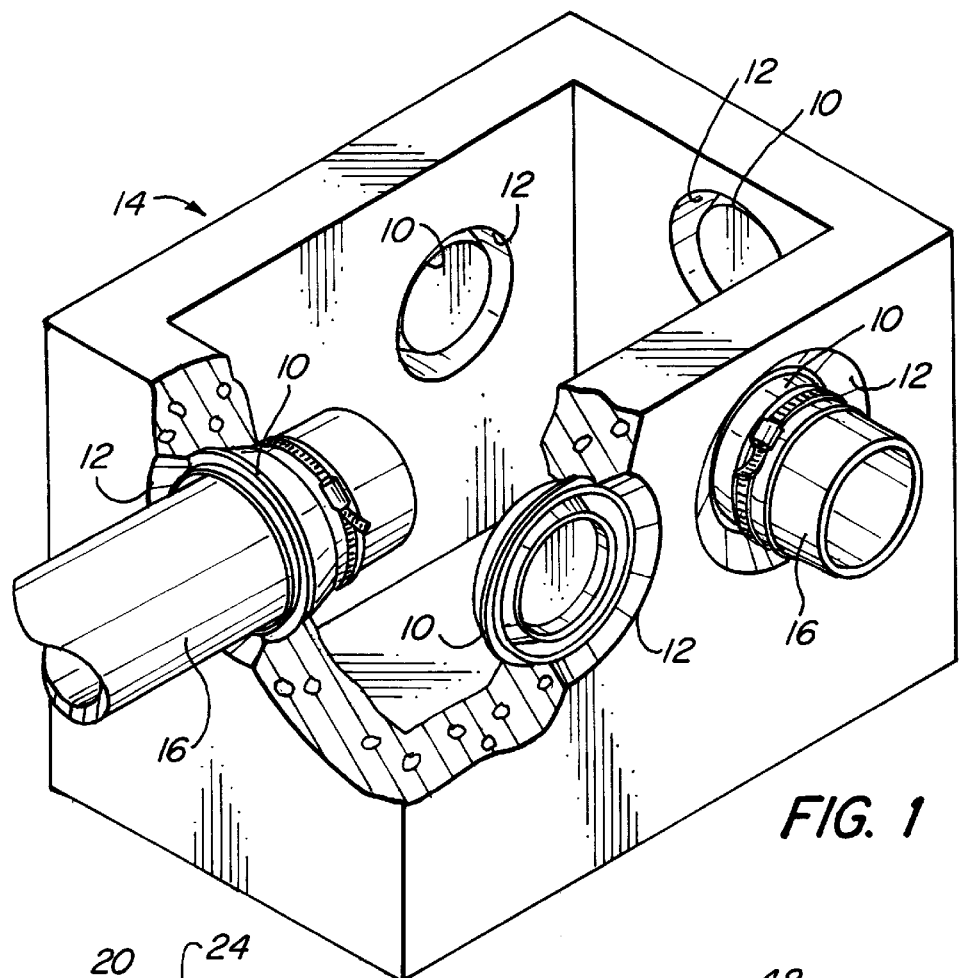
FIG. 1
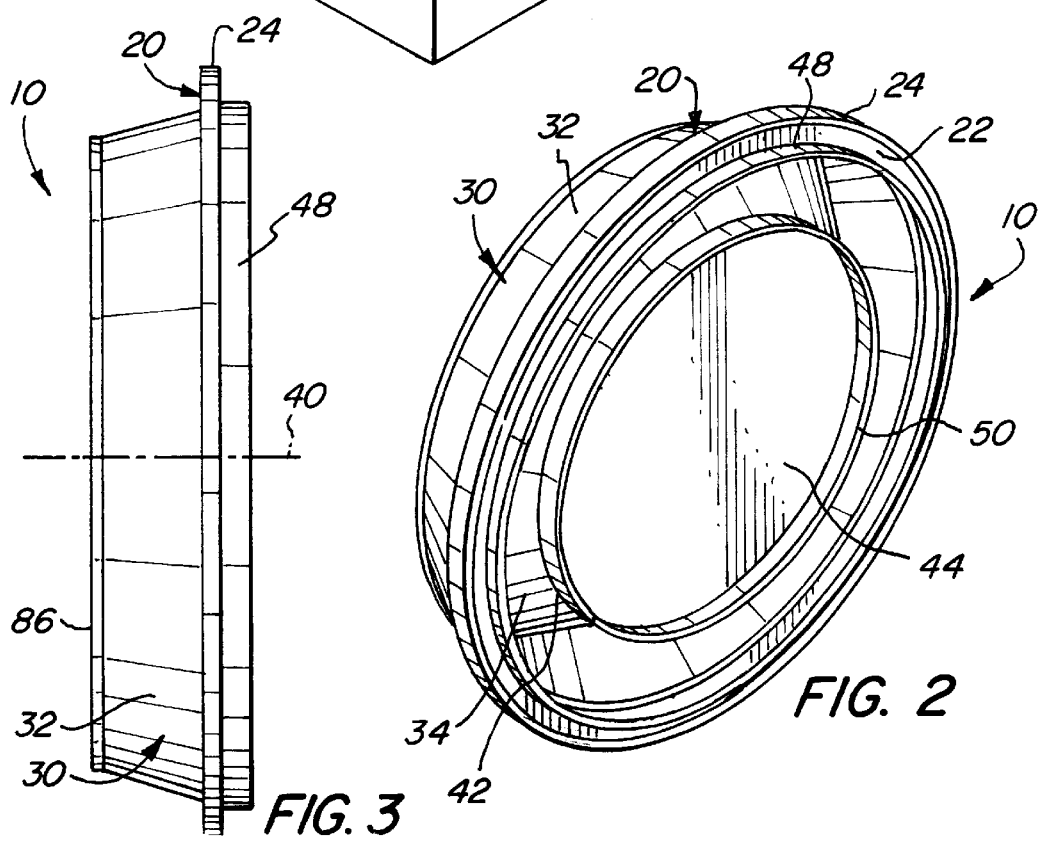
FIG. 2
FIG. 3

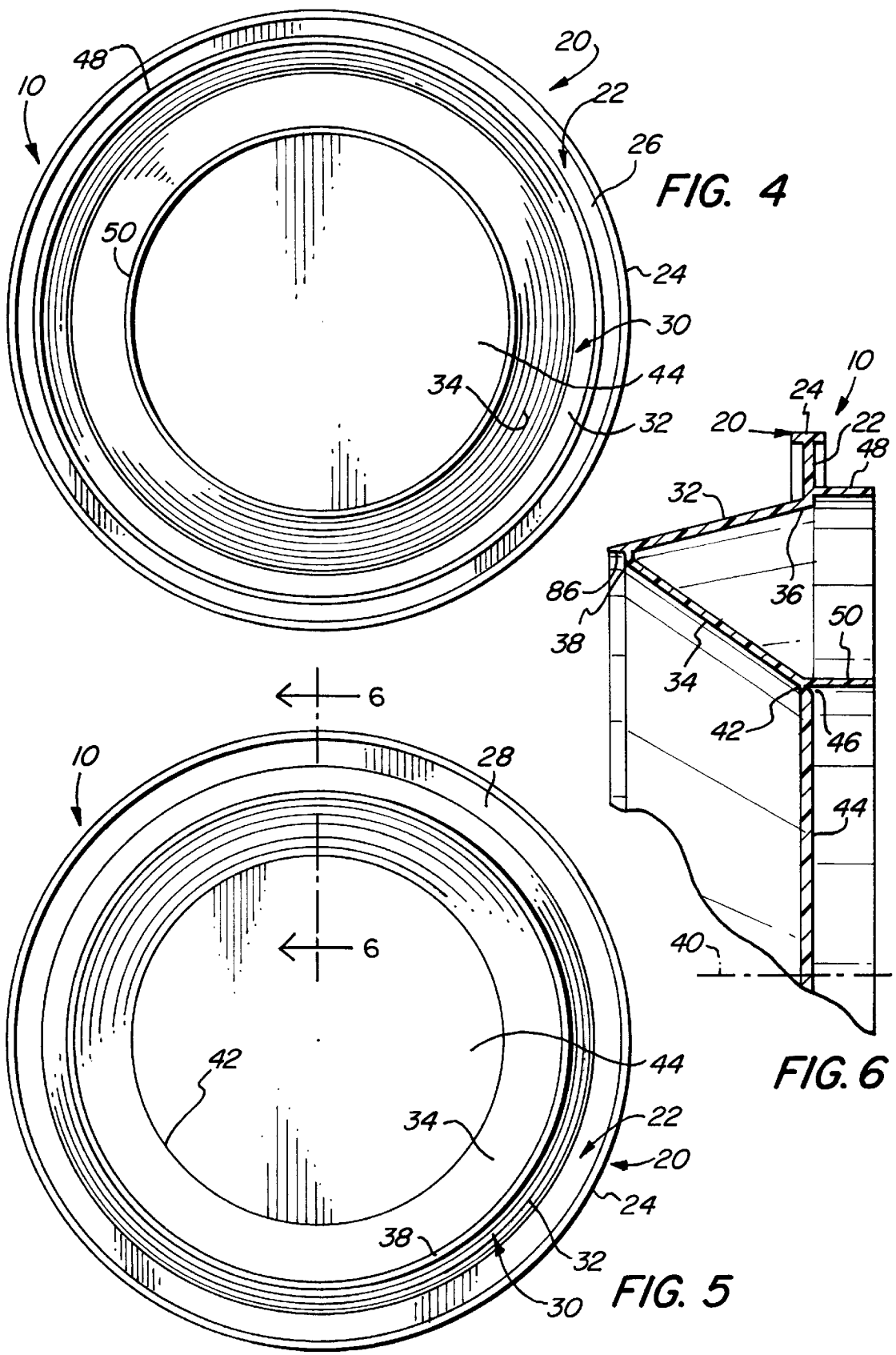

CAST-IN-PLACE PIPE SUPPORT HAVING A REVERSIBLE PIPE SEAL AND REMOVABLE CLOSURE DISK

FIELD OF THE INVENTION

The invention relates to a concrete fluid distribution box for use with a septic system and, more particularly, to a cast-in-place, pipe support for either closing a pipe-receiving aperture of the fluid distribution box or providing a water-tight seal for an inserted pipe.

BACKGROUND OF THE INVENTION

Cast-in-place combination aperture closures and pipe seals for use with on-site waste disposal systems, such as in a septic system having a poured concrete septic tank or fluid distribution box are known in the art. A septic tank or fluid distribution box normally has sidewalls defining pipe-receiving apertures for the receipt of inlet or outlet pipes. The combination aperture closure member and pipe seals, which are elastomeric, are positioned in the pipe-receiving apertures and cast in the concrete sidewalls surrounding the pipe-receiving apertures. The combination closure member and pipe seals are then used either to close the pipe-receiving apertures or are opened to provide a watertight seal for a pipe.

During assembly of a septic system it is sometimes preferable to insert a pipe from the inside of a septic tank or distribution box out, as opposed from the outside in. This "inside out" insertion is preferable, for example, when a septic tank is positioned very close to a distribution box. In addition, it is preferable to secure the pipe seal to the pipe with a clamp ring to ensure a strong and a watertight connection.

U.S. Pat. No. 4,732,397 to Gavin discloses an elastomeric seal and closure member including a cylindrical body portion and an integral frusto-conical skirt therein. The skirt has a knockout web at a smaller diameter end that can be removed to allow the frusto-conical skirt to receive the end of a pipe. The disclosed seal and closure member, however, only allows a pipe to be inserted into the fluid distribution box from outside the box. In addition, the frusto-conical skirt frictionally engages the pipe but is not adapted to receive a clamp for clamping the skirt to the pipe.

Gavin also discloses a mandrel for holding the seal and closure member in a form or mold during pouring of the concrete fluid distribution box. The mandrel is bolted to the form and has frusto-conical sidewall that tightly fits within the frusto-conical skirt of the seal and closure member to hold the seal and closure member in place until the concrete of the box is set and the mandrel and the form removed.

U.S. Pat. No. 4,951,914 to Meyers et al. discloses a pipe seal assembly including a seal member and a mandrel. The seal member includes a main cylindrical wall member and an integral frusto-conical flange member for receiving a pipe. The main cylindrical wall member releasably retains a knockout plug. The mandrel includes a frusto-conical sidewall having an undercut portion at a smaller diameter end thereof for tightly receiving and holding the frusto-conical flange member of the seal member. The disclosed seal member of Meyers et al., however, only allows a pipe to be inserted into the fluid distribution box from outside the box. In addition, the frusto-conical flange member frictionally engages the pipe but is not adapted to receive a clamp for clamping the flange member to the pipe.

What is desired, therefore, is a combination closure and pipe seal that allows a pipe to be inserted through the pipe seal from inside the container as well as from outside the container. The combination closure and pipe seal should also accommodate a clamp ring for clamping the pipe seal to the pipe to ensure a strong and watertight connection. In addition, a mandrel for securing the combination closure and pipe seal in a form or mold before and during pouring of a concrete container incorporating the combination closure and pipe seal is also desired.

SUMMARY OF THE INVENTION

Accordingly, one object of the present invention to provide a pipe support having a pipe seal that can easily receive a pipe that is inserted either from inside or outside the container.

Another object of the present invention is to provide a pipe seal having a removable closure for closing a pipe-receiving aperture of a concrete container when not used for receiving a pipe.

An additional object of the present invention is to provide a pipe seal having a pipe band that accommodates a clamp ring for clamping the pipe seal to a pipe.

A further object of the present invention is to provide a mandrel for holding the pipe seal of the present invention within a form during pouring of a concrete container.

These and other objects of the invention are achieved by a pipe support for mounting a pipe within a pipe-receiving aperture of a wall of a concrete container. The pipe support includes an annular anchor for being cast in place within the wall of the concrete container surrounding the pipe-receiving aperture, and a pipe seal. The pipe seal extends generally radially inwardly from the annular anchor to a smaller diameter end for receiving a pipe in a generally watertight manner. The pipe seal includes at least two flexible and reversible portions extending generally axially in opposite directions. One of the at least two portions of the pipe seal can be reversed so that the smaller diameter end of the pipe seal extends into the concrete container and a pipe can be inserted through the pipe seal from outside the container, or so that the smaller diameter end of the pipe seal extends out of the concrete container and a pipe can be inserted through the pipe seal from inside the container.

According to one aspect of the present invention, the at least two portions of the pipe seal include a generally frusto-conical outer portion and generally frusto-conical inner portion. The outer portion extends axially rearward and radially inward from an inner edge of the anchor to a joint, and the inner portion extends axially forward and radially inward from the joint to the smaller diameter end of the pipe seal. Reversing the inner portion causes the smaller diameter end of the pipe seal to extend into the concrete container, while reversing the outer portion causes the smaller diameter end of the pipe seal to extend out of the concrete container.

According to another aspect of the present invention, the pipe support includes a removable closure closing the smaller diameter end of the pipe seal for sealing, in a watertight manner, the pipe-receiving aperture of the concrete container when the pipe support is not used to mount a pipe.

According to an additional aspect of the present invention, the pipe support further includes a pipe band concentric with the pipe seal and extending axially forward from the smaller diameter end of the pipe seal to accommodate a clamping device for clamping the pipe band to a pipe extending therethrough.

According to a further aspect of the present invention, a mandrel is provided for forming the pipe-receiving aperture of the container and securing the pipe support within a concrete form during pouring of the concrete container. The mandrel includes a generally cylindrical outer wall for tightly receiving a containment sleeve of the pipe support that is concentric with and axially extends from a front face of the anchor, and a tubular inner wall for tightly receiving the pipe band of the pipe support. The outer wall tightly receiving the containment sleeve and the inner wall tightly receiving the pipe band, together secure the pipe support to the mandrel. The mandrel is in-turn securable to the concrete form.

The present invention also provides a container made of cementitious material for use as part of a low-pressure waste disposal system. The container includes at least one wall defining at least one pipe-receiving aperture, and a pipe support as described above positioned in each of the pipe-receiving apertures with the annular anchor cast-in-place within the wall surrounding the pipe-receiving aperture.

The present invention additionally provides a method of mounting a pipe within a pipe-receiving aperture defined by a wall of a cementitious container, wherein the pipe is inserted from outside the container. The method includes providing a pipe support as described above positioned within the pipe-receiving aperture, and reversing one of the at least two flexible and reversible portions of the pipe seal of the pipe support so that the smaller diameter end of the pipe seal extends into the concrete container. A pipe is then inserted, from outside the container, through the smaller diameter end of the pipe seal.

The present invention further provides a method of mounting a pipe within a pipe-receiving aperture defined by a wall of a cementitious container, wherein the pipe is inserted from inside the container. The method includes reversing one of the at least two flexible and reversible portions of the pipe seal of the pipe support so that the smaller diameter end of the pipe seal extends out of the concrete container. A pipe is then inserted, from inside the container, through the smaller diameter end of the pipe seal.

The invention and its particular features and advantages will become more apparent from the following detailed description considered with reference to the accompanying drawings.

BRIEF DESCRIPTION OF THE DRAWINGS

FIG. 1 is a perspective view of fluid distribution box, partially cut-away, incorporating five pipe supports according to the present invention and showing two of the pipe supports receiving pipes;

FIG. 2 is a perspective view of a pipe support according to the present invention;

FIG. 3 is a side view of the pipe support;

FIG. 4 is a front view of the pipe support;

FIG. 5 is a rear view of the pipe support;

FIG. 6 is a partial sectional view of the pipe support taken along the line 6—6 of FIG. 5;

FIG. 14A shows the pipe support anchored within the hardened concrete wall after removal of the form and the mandrel;

FIG. 15 shows a removable closure being removed from the pipe support;

FIG. 16 shows an inner portion of a pipe seal of the pipe support turned inside out;

FIG. 17 shows a pipe inserted through the pipe support from outside the distribution box and secured with a clamp ring;

FIG. 18 shows an outer portion of the pipe seal of the pipe support turned inside out;

FIG. 19 shows a pipe inserted through the pipe support from inside the distribution box and secured with a clamp ring;

DETAILED DESCRIPTION OF THE INVENTION

Figure 7A:
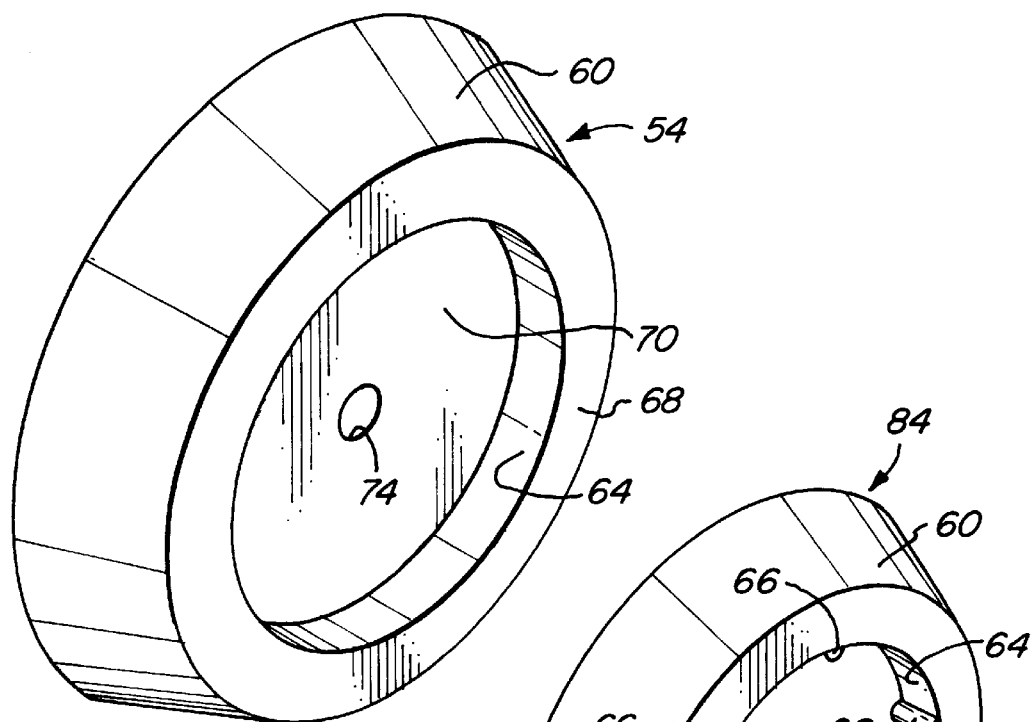
FIG. 7A is a rear perspective view of a mandrel according to the present invention.

Referring first to FIG. 1, the present invention provides pipe supports 10 for sealing pipe-receiving apertures 12 in a container 14, or for mounting pipes 16 within the pipe-receiving apertures 12. As shown, the container 14 is a concrete fluid distribution box for use as part of a septic system and includes walls 18 defining the pipe-receiving apertures 12. It should be noted, however, that the pipe support 10 according to the present invention can be used with any container 14 made of a poured, concrete-like material and having pipe-receiving apertures 12.

The pipe support 10 is made of a suitable resilient, yet flexible plastic and is formed as a unitary piece. Referring also to FIGS. 2–6, 12–22 and 24, the pipe support 10 includes an annular anchor 20 for being cast-in-place within the wall 18 of the concrete distribution box 14 surrounding the pipe-receiving aperture 12. The anchor 20 comprises a flange 22 radially extending outwardly to a rim 24, and the flange 22 has a front surface 26 and a rear surface 28.

The pipe support 10 also includes a pipe seal 30 having a flexible, reversible, generally frusto-conical outer portion 32 and a flexible, reversible, generally frusto-conical inner portion 34. The outer portion 32 extends axially rearward and radially inward from an inner edge 36 of the anchor 20 to a joint 38, at an angle of between about 12° and about 18° with reference to an axis 40 of the pipe support 10, and preferably at an at an angle of about 15°. The inner portion 34 of the pipe seal 30 extends axially forward and radially inward from the joint 38 to a smaller diameter end 42 of the pipe seal 30, at an angle of between about 28° and about 36° with reference to the axis 40 of the pipe support 10, and preferably at an angle of about 32°. (It should be noted that "axially forward" and "axially rearward" are used with reference to the front and rear surfaces 26,28 of the flange 22, while radially inward and radially outward are used with reference to the axis 40 of the pipe support 10.)

A removable closure 44 closes the smaller diameter end 42 of the pipe seal 30 for sealing in a water-tight manner the pipe-receiving aperture 12 of the concrete container 14 when the pipe support 10 is not used for mounting a pipe 16. The removable closure 44 is unitary with the smaller diameter end 42 of the pipe seal 30 at an outer margin 46 of reduced thickness.

A circular containment sleeve 48 is concentric with the annular anchor 20 and extends axially from the front surface 26 of the flange 22 of the anchor 20, and a circular pipe band 50 is concentric with, and extends axially forward from the smaller diameter end 42 of the pipe seal 30. The pipe band 50 is for accommodating a clamping device 52 for clamping the pipe band 50 to a pipe 16 extending through the smaller diameter end 42 of the pipe seal 30 and the pipe band 50 after removal of the removable closure 44 as discussed below.

Referring to FIGS. 7A, 8–13 and 20, the present invention also provides a mandrel 54 for securing the pipe support 10 in a form 56 during pouring of the concrete distribution box 14, as shown in FIGS. 12–14B and 20, and for forming the pipe-receiving aperture 12 in combination with the pipe support 10. The mandrel 54 includes a frusto-conical outer sidewall 58 having an outer surface 60 for tightly receiving the containment sleeve 48 of the pipe support 10 and for helping to form the pipe-receiving aperture 12. The mandrel 54 also includes a tubular inner sidewall 62 having an inner surface 64 for tightly receiving the pipe band 50 of the pipe support 10, whereby the outer sidewall 58 receiving the containment sleeve 48 and the inner sidewall 62 receiving the pipe band 50 together secure the pipe support 10 to the mandrel.

Figure 7B:
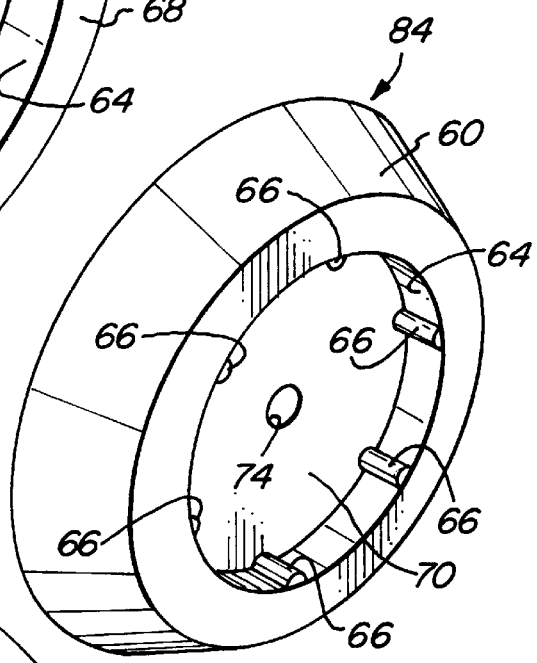
FIG. 7B is a rear perspective view of another mandrel according to the present invention.
Figure 8:
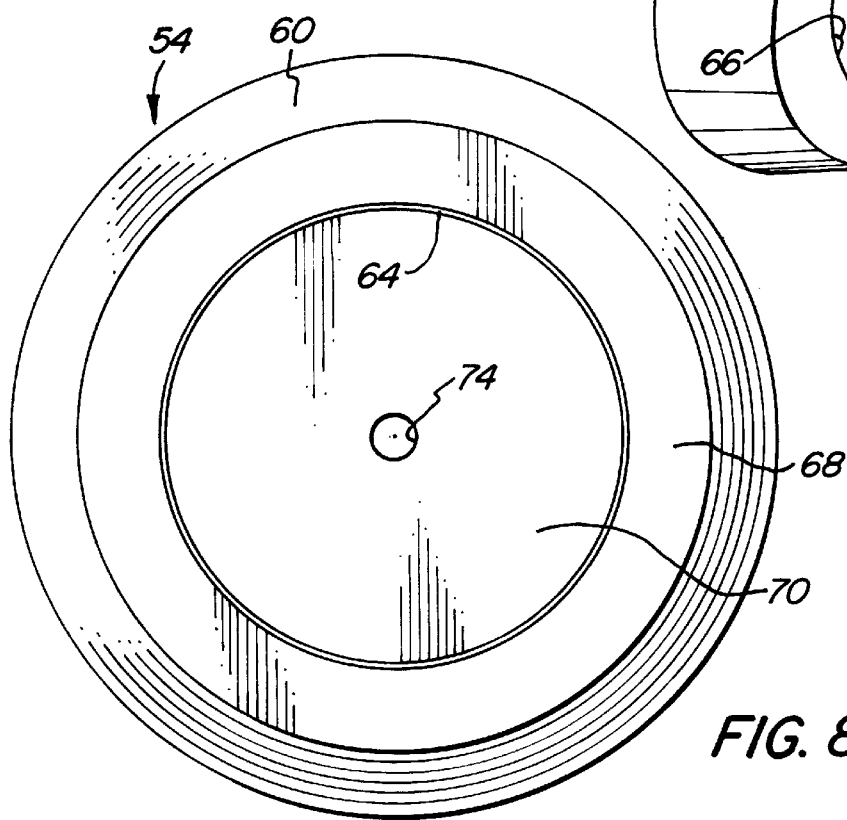
FIG. 8 is a rear view of the mandrel of FIG. 7A.
Figure 10:
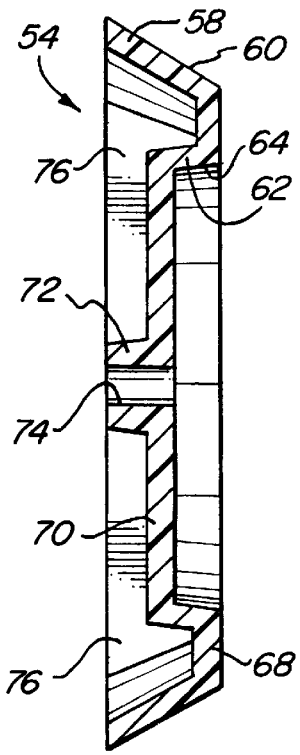
FIG. 10 is a sectional view of the mandrel taken along the line 10—10 of FIG. 9.
Figure 9:
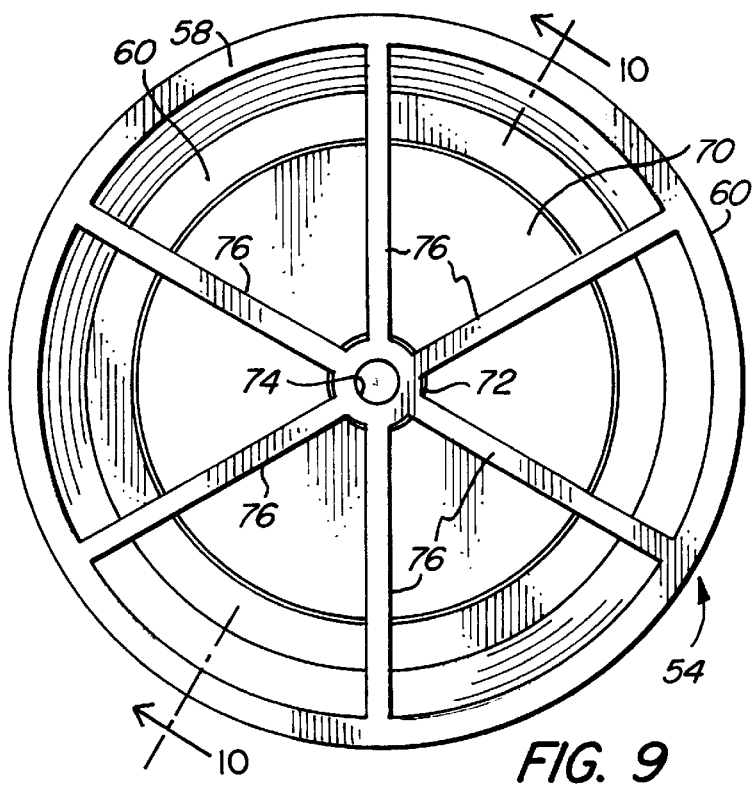
FIG. 9 is a front view of the mandrel of FIG. 7A.
Figure 11:
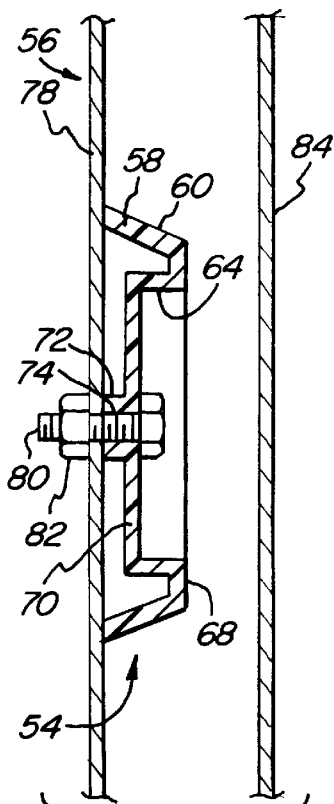
FIG. 11 shows the mandrel secured within a form for a wall of the poured concrete fluid distribution box.
Figure 12:
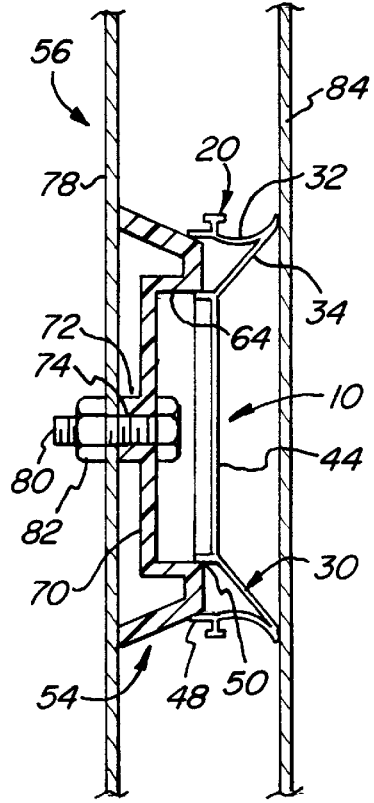
FIG. 12 shows the pipe support secured on the mandrel within the form.
Figure 13A:
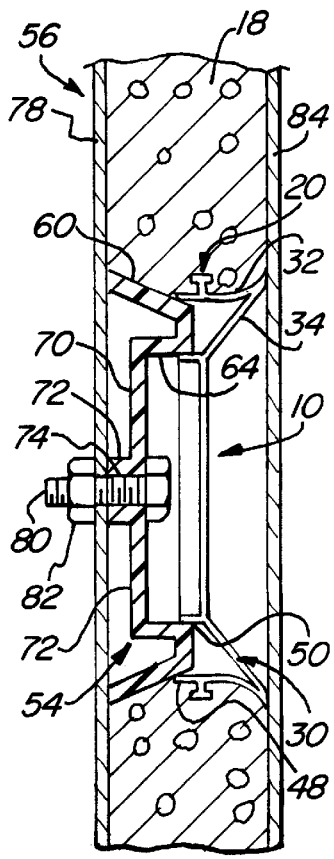
FIG. 13A shows the form filled with concrete around the mandrel and the pipe support.

Another mandrel 84 according to the present invention is shown in FIG. 7B. The mandrel 84 is similar to the mandrel 54 of FIGS. 7A, 8–13 and 20, and elements which are the same have the same reference numerals. The mandrel 84 also includes a plurality of spaced-apart protrusions 66 extending inwardly from the inner surface 64 of the inner sidewall 62 for gripping the pipe band 50 of the pipe support 10.

Referring back to FIGS. 7A, 8–13 and 20, the mandrel 54 additionally has an annular rear endwall 68 joining the outer sidewall 58 to the inner sidewall 62, and an annular front endwall 70 joining the inner sidewall 62 to a centrally located fastener tube 72. The fastener tube 72 defines a fastener-receiving opening 74 for receiving a fastener 80, and six spaced-apart structural strengthening ribs 76 extend between the outer sidewall 58 and the fastener tube.

Referring to FIGS. 11, 12, 13A, 13B, 14A, and 14B, a method according to the present invention of forming a pipe-receiving aperture 12 within the wall 18 of the concrete distribution box 14 and mounting the pipe support 10 within the pipe-receiving aperture 12 is shown. The method first includes securing the mandrel 54 to a first partition 78 of the form 56 with a fastener 80, which as shown can be a threaded bolt, which passes through the fastener-receiving opening 74 and the first partition and is secured with a nut 82. The pipe support 10 is then secured to the mandrel 54 by fitting the pipe band 50 of the pipe support 10 within the inner sidewall 62 of the mandrel and the containment sleeve 48 around the outer sidewall 58 of the mandrel.

Although the pipe support 10 is shown secured between the mandrel 54 and a second partition 84 of the form 56, it should be noted that the mandrel can independently secure the pipe support 10 prior to pouring of the concrete, and secures the pipe support 10 in combination with the second partition during pouring. In addition, although not shown, the first partition 78 of the form 56 might alternatively include a hinged door that the mandrel 54 would be secured to, so that the form could first be assembled prior to and independently of the mandrel and pipe support 10 and the hinged door could be opened to position the mandrel and the pipe support therein.

After the mandrel 54 and pipe support 10 are positioned and secured within the form 56, the concrete can be poured into the form to cast the wall 18 of the concrete distribution box 14. As shown in FIGS. 12, 13A, 13B and 20, the mandrel 54 and the pipe support 10 are sized so that combined they are thicker than the distance between the first and the second partitions 78,84 of the form 56. In this way, the pipe support 10 is compressed against the mandrel 54 by the first and the second partitions 78,84 so that the outer portion 32 of the pipe support is actually bowed outwardly and the containment sleeve 48 is engaged more tightly around the mandrel to ensure that concrete does not pass between the pipe support and the mandrel. In addition, referring to FIGS. 6, 13B and 14B, the outer portion 32 of the pipe seal 30 includes an overhang 86 extending just beyond the joint 38. The overhang 86 ensures that the joint 38 is not covered up and hindered by concrete.

Figure 14B:
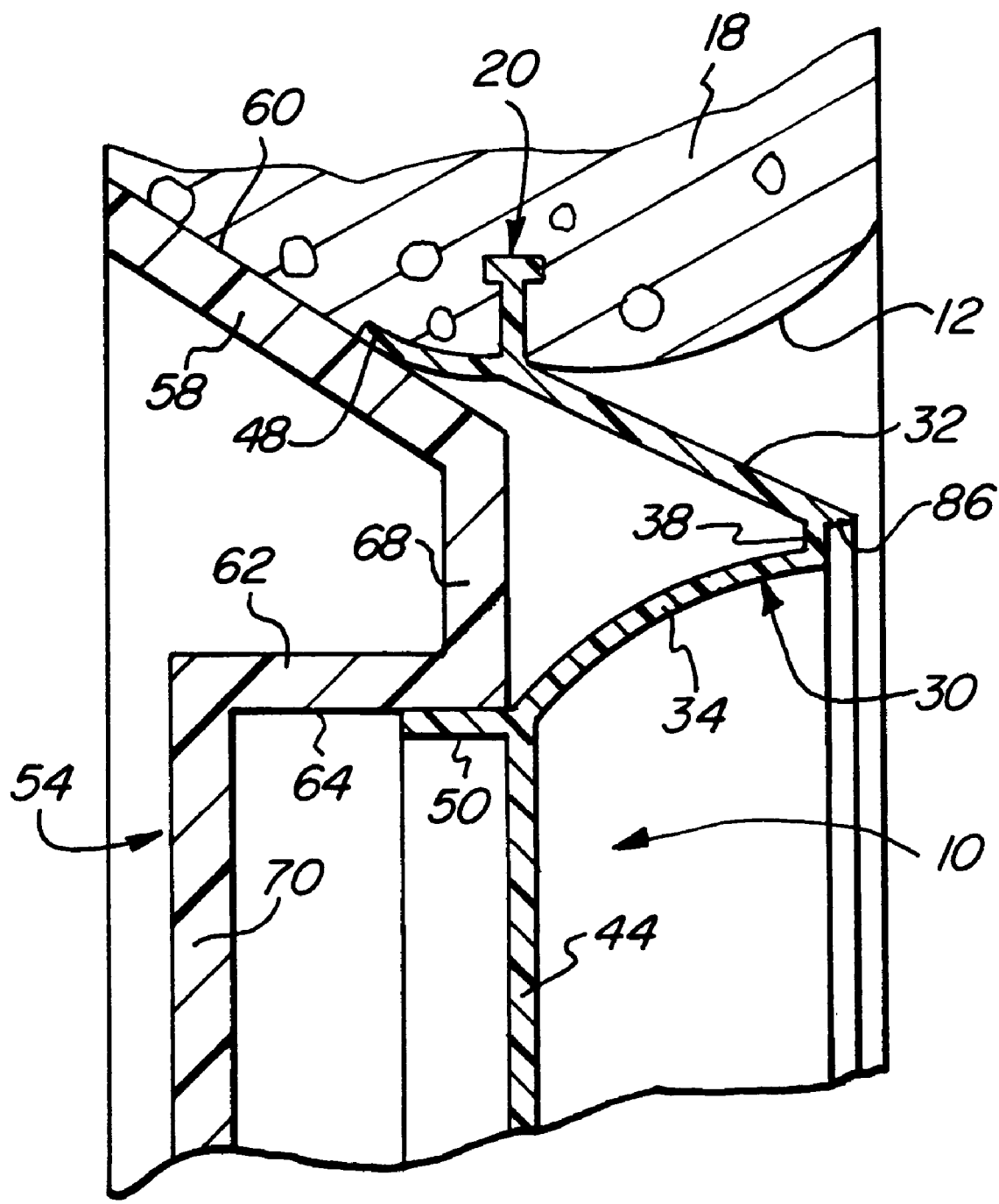
FIG. 14B is an enlargement of a portion of FIG. 14A.
Figure 14B:
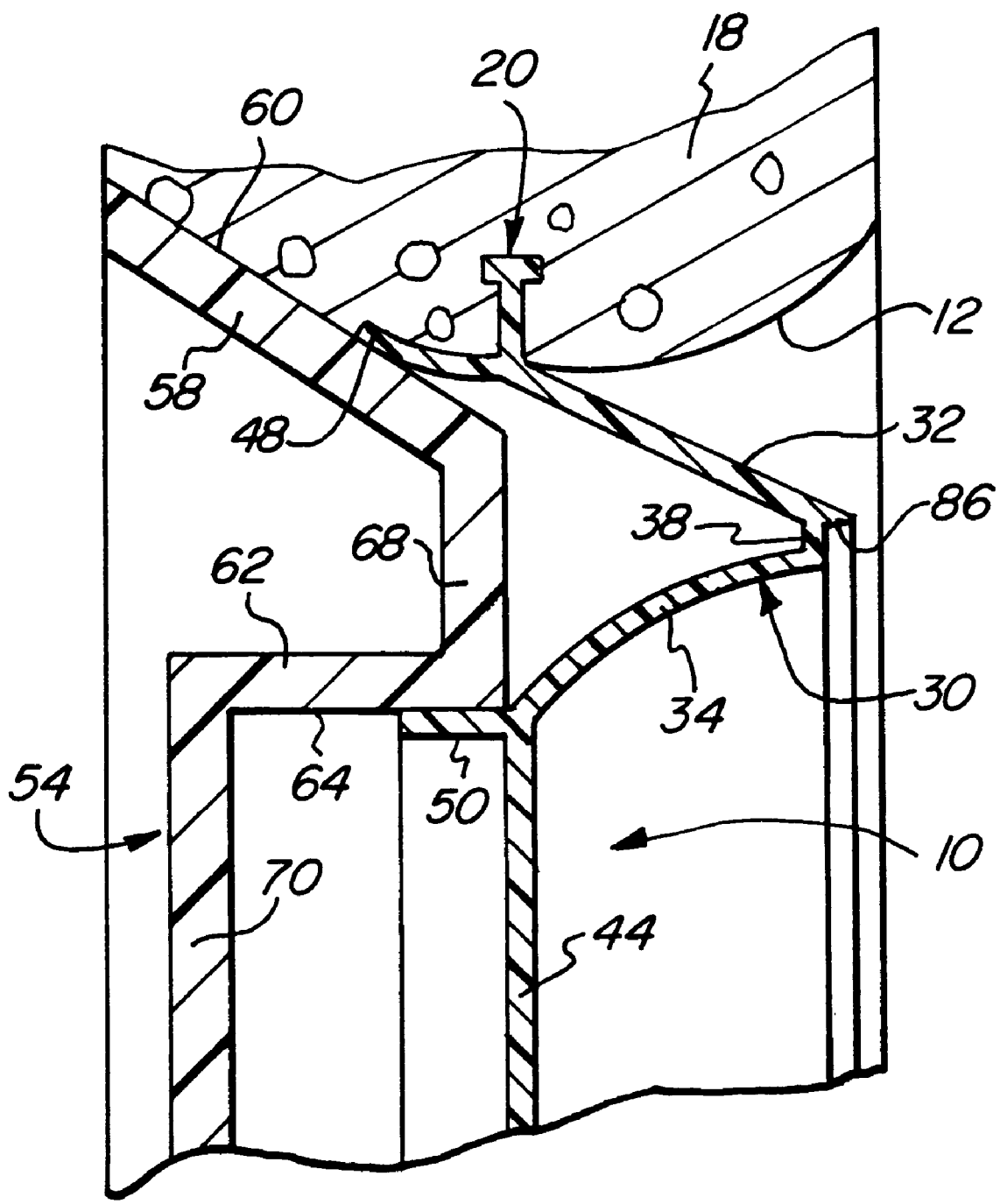

As shown, the flange 22 and the rim 24 of the anchor 20 are encased in the concrete material to secure the pipe support 10 within the wall 18 upon drying or curing of the concrete. Once the concrete has dried, the form 56 and mandrel 54 are removed, leaving the pipe support 10 anchored within the pipe-receiving aperture 12 of the newly formed wall 18 as shown in FIGS. 14B and 15. The outer portion 32 of the pipe seal 30 returns to its original form, i.e. not bowed outwardly, thereby leaving a space between the outer portion and the pipe-receiving aperture 12. The space allows the pipe seal 30 to flex somewhat to more easily receive a pipe.

The pipe support 10, as shown in FIGS. 14A, 14B, can be left as is with the removable closure 44 intact, to provide a water-tight seal for the pipe-receiving aperture 12. Alternatively, as shown in FIG. 15, the removable closure 44 can be removed, by breaking the outer margin 46 of reduced thickness (with a screw driver for example), so that the pipe support 10 can be used to mount a pipe 16 within the pipe-receiving aperture 12.

Referring to FIGS. 16–17, a method according to the present invention of inserting a pipe 16 through the pipe support 10 into the fluid distribution box 14 from outside the box is shown. First, the inner portion 34 of the pipe seal 30 is reversed so that the smaller diameter end 42 of the pipe seal 30 extends into the distribution box 14. Then the pipe seal 30 is able to easily accept the pipe 16 inserted from outside the box 14 while providing a watertight seal around the pipe. Finally, a clamping ring 52 may be fitted around the pipe band 50 of the pipe support 10, which is also turned inside out, to ensure a strong and watertight connection.

Referring to FIGS. 18–19, a method according to the present invention of inserting a pipe 16 through the pipe support 10 out of the fluid distribution box 14 from inside the box is shown. First, the outer portion 32 of the pipe seal 30 is reversed so that the smaller diameter end 42 of the pipe seal 30 extends out of the distribution box 14. Then the pipe seal 30 is able to easily accept the pipe 16 inserted from inside the box 14 while providing a watertight seal around the pipe 16. Finally, a clamping ring 52 may be fitted around the pipe band 50 of the pipe support 10 to ensure a strong and watertight connection.

Figure 20:
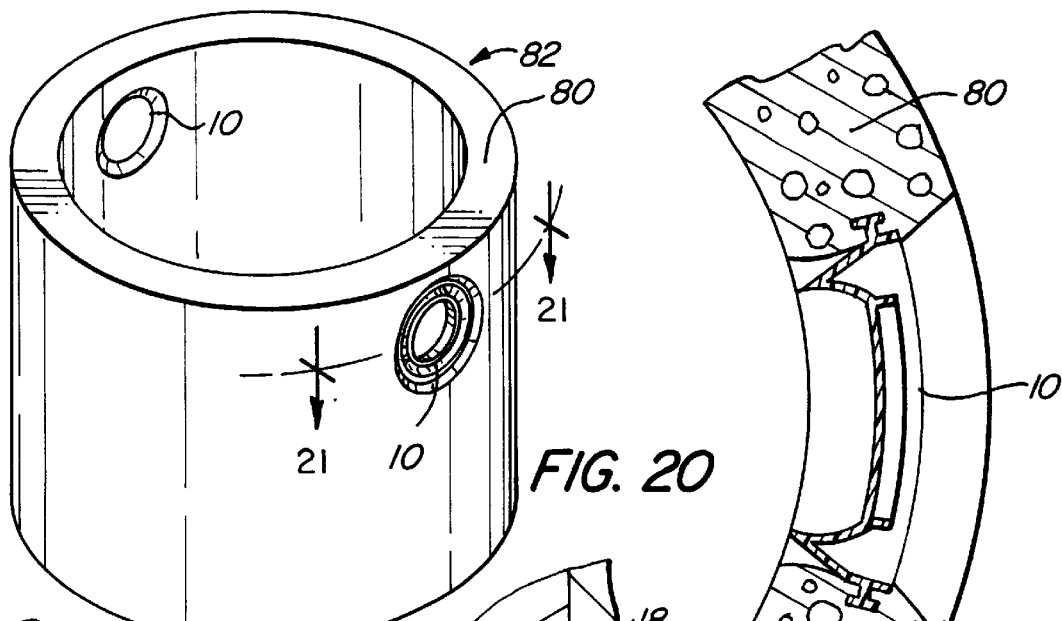
FIG. 20 is a perspective view of a cylindrical fluid distribution box incorporating two pipe supports according to the present invention.
Figure 21:
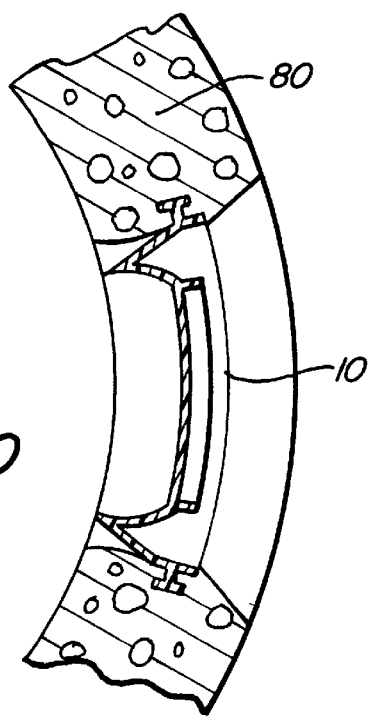
FIG. 21 is a sectional view of the pipe support anchored in a wall of the cylindrical fluid distribution box taken along the line 21—21 of FIG. 20.
Figure 13B:
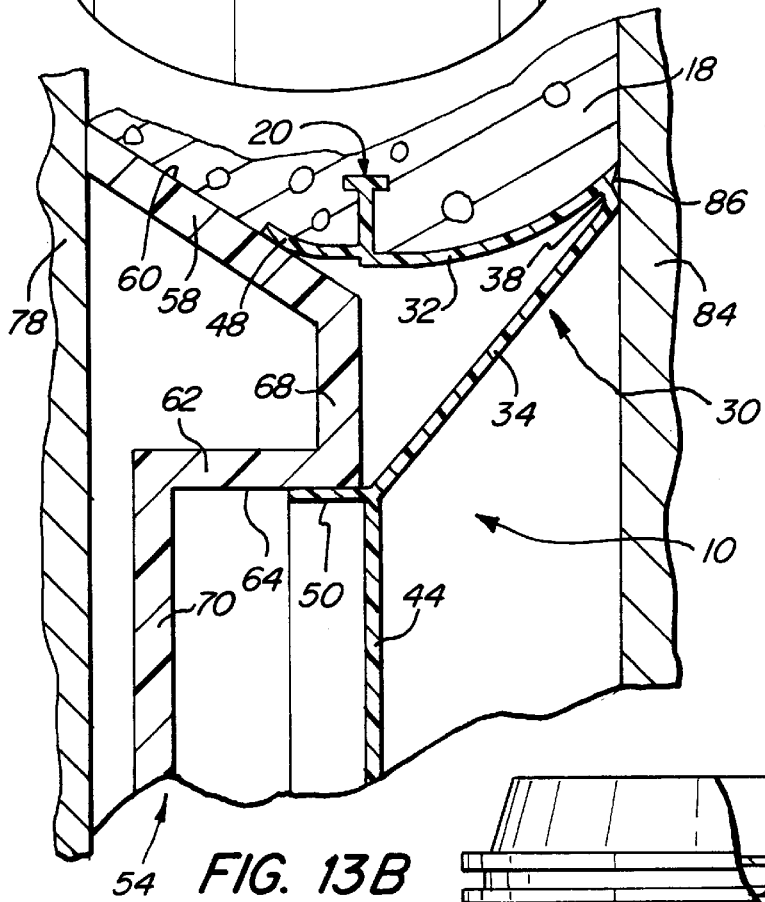
FIG. 13B is an enlargement of a portion of FIG. 13A.

As shown in FIGS. 20 and 21, the flexible pipe support 10 according to the present invention is ideal for use in a tubular wall 80 of a cylindrical concrete distribution box 82 because the pipe support can be bent and still correctly receive a pipe.

Figure 22:
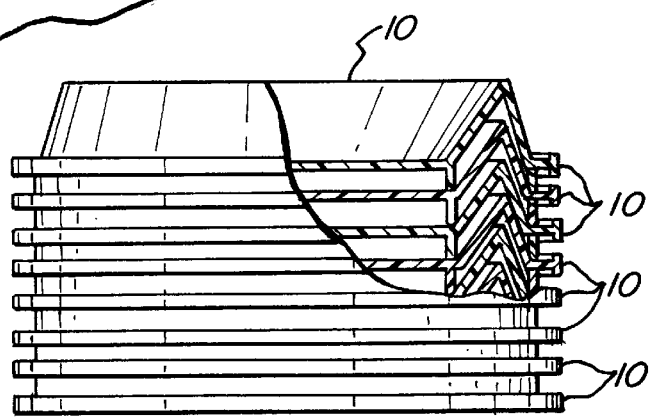
FIG. 22 is a plurality of pipe supports according to the present invention nested together.

As shown in FIG. 22, another benefit of the pipe support 10 of the present invention is that the pipe support is very nestable, i.e. a plurality of the pipe supports can be relatively compactly packaged for shipment. It has been found, for example, that 1000 of the pipe supports 10 according to the present invention can be packaged in a box that would normally hold 250 pipe seals as disclosed by either Gavin, U.S. Pat. No. 4,732,397 or Meyers et al., U.S. Pat. No. 4,951,914.

It should be noted that the pipe seal 30 of the pipe support 10 can take many forms without departing from the scope of the present invention. In general, the pipe seal 30 should extend generally inwardly from the annular anchor 20 to a smaller diameter end 42 for receiving a pipe 16 in a generally watertight manner. The pipe seal 30 should also include at least two flexible and reversible portions (i.e. 32,34) extending generally axially in opposite directions, whereby one of the at least two portions of the pipe seal 30 can be reversed so that the smaller diameter end 42 of the pipe seal 30 extends either into or out of the concrete container 14 when the pipe support 10 is secured in the pipe-receiving aperture 12.

The present invention, therefore, provides a pipe support 10 having a pipe seal 30 that allows a pipe 16 to be inserted through the pipe seal 30 from inside a container 14 as well as from outside the container. The pipe support 10 also includes a removable closure 44 for sealing the pipe-receiving aperture 12 when not used for receiving a pipe 16. The pipe support 10 further includes a pipe band 50 that accommodates a clamp ring 52 for clamping the pipe seal 30 to the pipe 16 to ensure a strong and watertight connection. The present invention also provides mandrels 54 for securing the pipe support 10 in a form 56 before and during pouring of the concrete container 14 incorporating the pipe support 10.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A container made of cementitious material for use as part of a low pressure waste disposal system, the container comprising:
   A) at least one wall defining at least one pipe-receiving aperture;
   B) a pipe support positioned in said at least one pipe-receiving aperture and including,
      a sleeve having an annular anchor extending radially therefrom and being cast in place within the wall surrounding said at least one pipe-receiving aperture; and
      a pipe seal extending generally axially inwardly from the sleeve to a smaller diameter end for receiving a pipe in a generally water-tight manner, and including at least two flexible and reversible portions extending generally axially in opposite directions, whereby one of the at least two portions of the pipe seal can be reversed so that the smaller diameter end of the pipe seal extends either into or out of the concrete container when the pipe support is secured in the pipe-receiving aperture.

2. A cementitious container according to claim 1 wherein the pipe support further includes a removable closure closing the smaller diameter end of the pipe seal for sealing in a water-tight manner said at least one pipe-receiving aperture of the wall when the pipe support is not used for mounting a pipe.

3. A cementitious container for use as part of a low pressure waste disposal system, the container having at least one wall defining at least one aperture, and a pipe support positioned in said at least one aperture, the pipe support comprising:
   a sleeve having an anchor extending radially therefrom, the sleeve and the anchor being cast in place within the wall surrounding said at least one aperture;
   a first seal portion extending from said sleeve generally radially inwardly and generally longitudinally in a first direction with respect to said sleeve to a joint; and
   a second seal portion extending from the joint generally radially inwardly and generally longitudinally in a second direction opposite to the first direction to a smaller diameter end for receiving a pipe, said first seal portion and said second seal portion being flexible and reversible so that a pipe can be inserted from either side of the wall.

4. The cementous container of claim 3 wherein the pipe support further comprises a removable closure closing the smaller diameter end for sealing the aperture when the pipe support is not used for mounting a pipe.

5. The cementous container of claim 4 wherein the removable closure is attached to the smaller diameter end at an outer margin of reduced thickness.

6. The cementous container of claim 3 wherein said second seal portion includes a pipe band portion extending from the smaller diameter end concentrically with said sleeve for accommodating a clamp to enhance sealing of the pipe.

7. The cementous container of claim 6 wherein said first seal portion and said second seal portion can be positioned so that at least the pipe band portion extends out beyond the wall on either side of the wall to facilitate attachment of a clamp about the pipe support regardless of which side of the wall the pipe is inserted from.

8. A cementitious container for use as part of a low pressure waste disposal system, the container having at least one wall defining at least one aperture, and a pipe support positioned in said at least one aperture, the pipe support comprising:
   a sleeve having an anchor extending radially therefrom, the sleeve and the anchor being cast in place within the wall surrounding said at least one aperture;
   a first seal portion extending from said sleeve generally radially inwardly and generally longitudinally in a first direction with respect to said sleeve to a joint;
   a second seal portion extending from the joint generally radially inwardly and generally longitudinally in a second direction opposite to the first direction to a smaller diameter end for receiving a pipe, said first seal portion and said second seal portion being flexible and reversible so that a pipe can be inserted from either side of the wall;
   a pipe band portion extending from the smaller diameter end concentrically with said sleeve for accommodating a clamp to enhance sealing of the pipe; and a removable closure attached to the smaller diameter end at an outer margin of reduced thickness for sealing the aperture when the pipe support is not used for mounting a pipe.

9. The cementous container of claim 8 wherein said first seal portion and said second seal portion can be positioned so that at least the pipe band portion extends out beyond the wall on either side of the wall to facilitate attachment of a clamp about the pipe support regardless of which side of the wall the pipe is inserted from.

* * * * *